(12) United States Patent
Yasutomi

(10) Patent No.: US 11,828,931 B2
(45) Date of Patent: Nov. 28, 2023

(54) SCANNER SYSTEM AND SCAN METHOD

(71) Applicant: TOPCON CORPORATION, Tokyo (JP)

(72) Inventor: Satoshi Yasutomi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 704 days.

(21) Appl. No.: 16/949,090

(22) Filed: Oct. 13, 2020

(65) Prior Publication Data
US 2021/0124165 A1 Apr. 29, 2021

(30) Foreign Application Priority Data
Oct. 25, 2019 (JP) .................................. 2019-194722

(51) Int. Cl.
*G01C 3/08* (2006.01)
*G02B 26/10* (2006.01)
*G02B 26/12* (2006.01)
*G01S 7/481* (2006.01)
*G01S 17/86* (2020.01)
*G01S 7/295* (2006.01)
*G01S 17/89* (2020.01)

(52) U.S. Cl.
CPC ............ *G02B 26/101* (2013.01); *G01S 7/295* (2013.01); *G01S 7/4817* (2013.01); *G01S 17/86* (2020.01); *G02B 26/127* (2013.01); *G01S 17/89* (2013.01); *G02B 26/105* (2013.01)

(58) Field of Classification Search
None
See application file for complete search history.

(56) References Cited

U.S. PATENT DOCUMENTS

| | | | | |
|---|---|---|---|---|
| 7,345,748 B2 * | 3/2008 | Sugiura | ................ | G01C 15/002 356/139.05 |
| 2016/0138919 A1 * | 5/2016 | Green | .................. | H04N 23/633 348/135 |
| 2018/0003825 A1 | 1/2018 | Komeichi et al. | | |
| 2022/0172406 A1 * | 6/2022 | Mueller | ................. | G01C 11/08 |

FOREIGN PATENT DOCUMENTS

| | | | | |
|---|---|---|---|---|
| CN | 110192082 A | * | 8/2019 | ........... G01S 7/4813 |
| JP | 2018-4401 A | | 1/2018 | |

* cited by examiner

*Primary Examiner* — Mark Hellner
(74) *Attorney, Agent, or Firm* — Thomas W. Cole; Calderon Safran & Cole P.C.

(57) ABSTRACT

Provided is a scanner system includes a laser scanner and a remote controller thereof. The remote controller includes a guide light transmitting unit. The laser scanner includes a guide light receiving unit for detecting the guide light transmitting unit. The laser scanner directs the optical axis of distance-measuring light to the guide light transmitting unit based on a light reception signal and set a data exclusion range with reference to the direction of the guide light transmitting unit. The laser scanner re-measures point cloud data of the data exclusion range in accordance with a measurement permission from the remote controller upon measuring point cloud data of an entire measurement range, and deletes the point cloud data of the data exclusion range from the point cloud data of an entire measurement range, and replacing the deleted data with remeasured point cloud data to acquire entire point cloud data.

9 Claims, 10 Drawing Sheets

SCANNER SYSTEM AND SCAN METHOD

CROSS-REFERENCE TO RELATED APPLICATION(s)

The present application claims priority under 35 U.S.C. § 119 to Japanese Patent Application No. 2019-194722 filed Oct. 25, 2019. The contents of this application are incorporated herein by reference in their entirely.

TECHNICAL FIELD

The present invention relates to a ground-installed laser scanner and, more particularly, to a scanner system using a remote controller and a laser scanner and a scan method.

BACKGROUND

A ground-installed laser scanner is known as a surveying instrument that obtains three-dimensional point cloud data of a measurement target (see, for example, Patent Document 1).

In point cloud data measurement using such a laser scanner, first, a scanner is installed at a measurement point. Next, in the case of a backward intersection method, reflecting targets such as prisms are installed at two or more known backward intersection points. In the rear viewpoint-and-instrument-point method, a reflecting target is installed at a known rear viewpoint. The distance to the reflecting target and the angle of the reflecting target are then measured. Then, the entire circumference is then scanned (full dome scan).

RELATED ART DOCUMENT

Patent Document

Patent Document 1 Japanese Published Unexamined Patent Application No. 2018-4401.

SUMMARY OF INVENTION

Technical Problem

However, in the laser scanner disclosed in Patent Literature 1, sometimes scanning starts while a reflecting target is collimated, or a worker on the reflecting target side sometimes cannot recognize the direction in which the laser scanner starts scanning. For this reason, the point cloud data obtained by a full dome scan may reflect an unnecessary reflecting target or the worker holding the reflecting target.

If a worker, etc., is reflected in the point cloud data, the reflection of the worker, etc., cannot be noticed until the measurement data is brought back to the office and the point cloud data is integrated. This makes it necessary for the worker to visit the site again to perform measurement.

The present invention has been made in view of such circumstances and has an object to provide a technique that can prevent remeasurement after a worker brings back three-dimensional point cloud data to the office upon measurement of the three-dimensional point cloud data with a laser scanner even when the worker or an unnecessary target may be reflected in the data.

Solution to Problem

In order to achieve the object described above, a scanner system according to an aspect of the present invention includes a remote controller including an arithmetic control unit configured to transmit an operation command to a laser scanner and a guide light transmitting unit configured to scan a fan beam as guide light in a vertical direction and a laser scanner including a guide light receiving unit configured to receive the guide light and detect the horizontal direction of the center of the guide light transmitting unit and a point cloud data measuring unit configured to acquire three-dimensional point cloud data by scanning distance-measuring light in a vertical direction and a horizontal direction and performing distance measurement and angle measurement with respect to an irradiation point of the distance-measuring light. The laser scanner includes a guide light direction detection unit configured to direct the optical axis of the distance-measuring light to the guide light transmitting unit based on a light reception signal from the guide light receiving unit and a data exclusion range setting unit configured to set a predetermined angle range as a data exclusion range with reference to the direction of the guide light transmitting unit, and the point cloud data measuring unit remeasures point cloud data of the data exclusion range in accordance with a measurement permission from the remote controller after measuring point cloud data of an entire measurement range set in advance, deletes point cloud data of the data exclusion range from point cloud data of an entire measurement range which is measured first, and acquires entire point cloud data by replacing the deleted point cloud data with remeasured point cloud data.

In the aspect described above, it is also preferable that the remote controller includes a reflecting target, the laser scanner includes an automatic collimation execution unit configured to emit collimation light different in wavelength from the distance-measuring light and automatically collimate the reflecting target based on a light reception signal from an automatic collimation unit configured to receive reflected light of the collimation light and a target scan execution unit configured to perform distance measurement and angle measurement with respect to the reflecting target, and the data exclusion range is set as the predetermined angle ranges as the predetermined distance ranges on both sides of the direction of the guide light transmitting unit in a circumferential direction.

In the aspect described above, it is also preferable that the laser scanner includes an indicator configured to notify the end of measurement of point cloud data of an entire measurement range set in advance.

In the aspect described above, it is also preferable that the laser scanner includes a camera configured to acquire a landscape image in the measurement range of the laser scanner and a landscape image acquisition unit configured to control the camera, and the camera re-captures a landscape image of the data exclusion range in accordance with a measurement permission from the remote controller upon capturing a landscape image of an entire measurement range set in advance, deletes the landscape image of the data exclusion range from the landscape image of an entire measurement range, and replaces the deleted landscape image with a remeasured landscape image of the data exclusion range to acquire a landscape image of an entire measurement range.

A scan method according to another aspect of the present invention uses a remote controller including an arithmetic control unit configured to transmit an operation command to a laser scanner and a guide light transmitting unit configured to scan a fan beam as guide light in a vertical direction, and a laser scanner including a guide light receiving unit configured to receive the guide light and detect the horizontal direction of the center of the guide light transmitting unit and configured to acquire three-dimensional point cloud data by scanning distance-measuring light in a vertical direction and a horizontal direction and performing distance measurement and angle measurement with respect to an irradiation point of the distance-measuring light. The method includes (a) the laser scanner detecting the direction of the guide light transmitting unit and directing the optical axis of the distance-measuring light to the guide light transmitting unit based on a light reception signal from the guide light receiving unit, (b) the laser scanner setting a data exclusion range with reference to the direction of the guide light transmitting unit, (c) the laser scanner measuring point cloud data of an entire measurement range set in advance, (d) the laser scanner receiving a measurement permission for the data exclusion range from the remote controller, and (e) the laser scanner remeasuring point cloud data of the data exclusion range, deleting point cloud data of the data exclusion range from point cloud data of an entire measurement range which is measured first, and replacing the deleted point cloud data with remeasured point cloud data to acquire point cloud data of an entire measurement range.

BENEFIT OF INVENTION

According to the aspects described above, it is possible to prevent remeasurement after a worker brings back three-dimensional point cloud data to the office upon measurement of the three-dimensional point cloud data with a laser scanner even when the worker or an unnecessary target may be reflected in the data.

DESCRIPTION OF EMBODIMENTS

Figure 1:
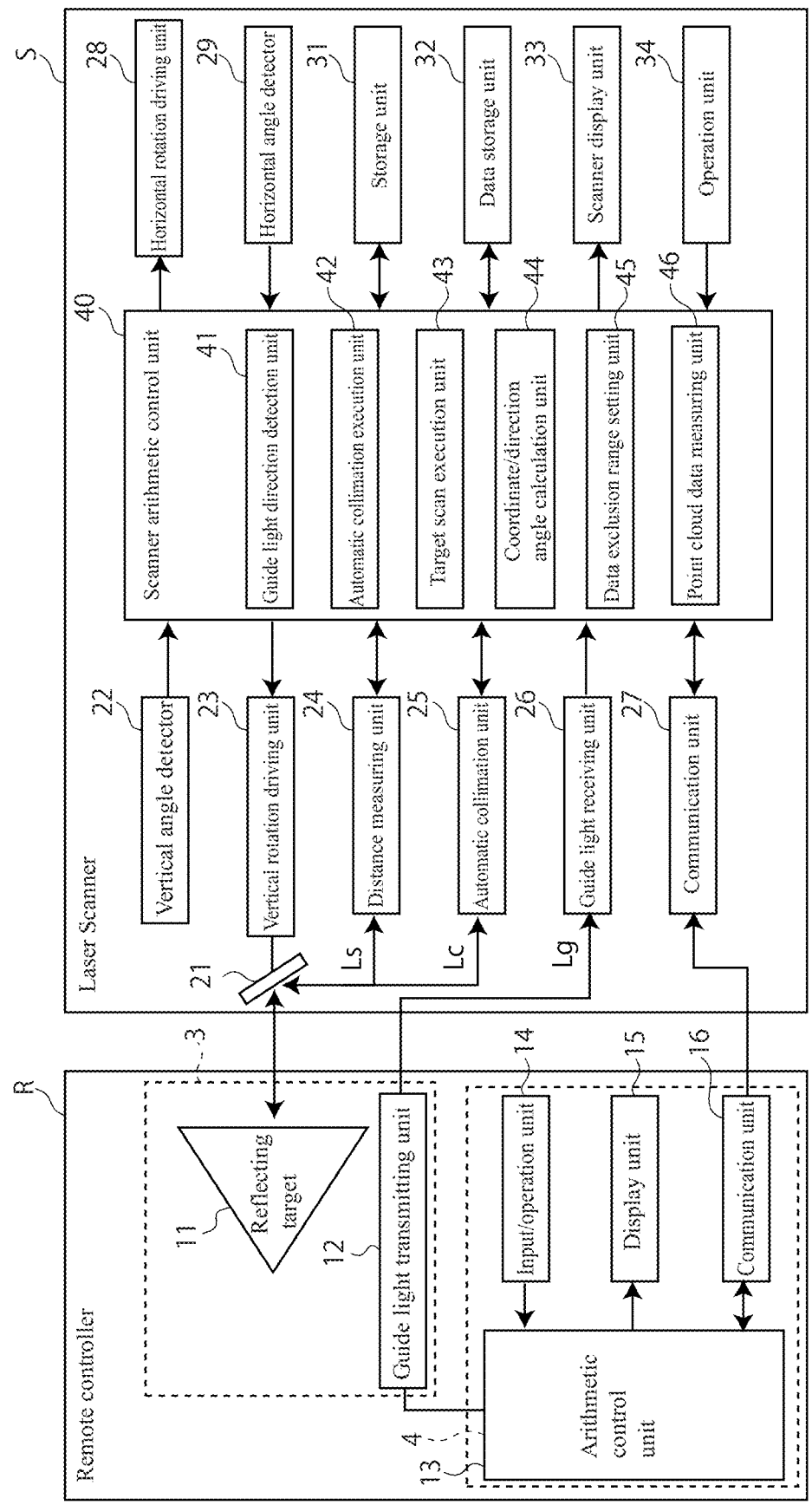
FIG. 1 is a configuration block diagram of a scanner system according to an embodiment of the present invention.

Preferred embodiments of the present invention will be described below with reference to the accompanying drawings. However, the present invention is not limited to these preferred embodiments. In the respective embodiments, the same reference numerals denote the same components. Redundant descriptions will be omitted as appropriate.

First Embodiment

Figure 2:
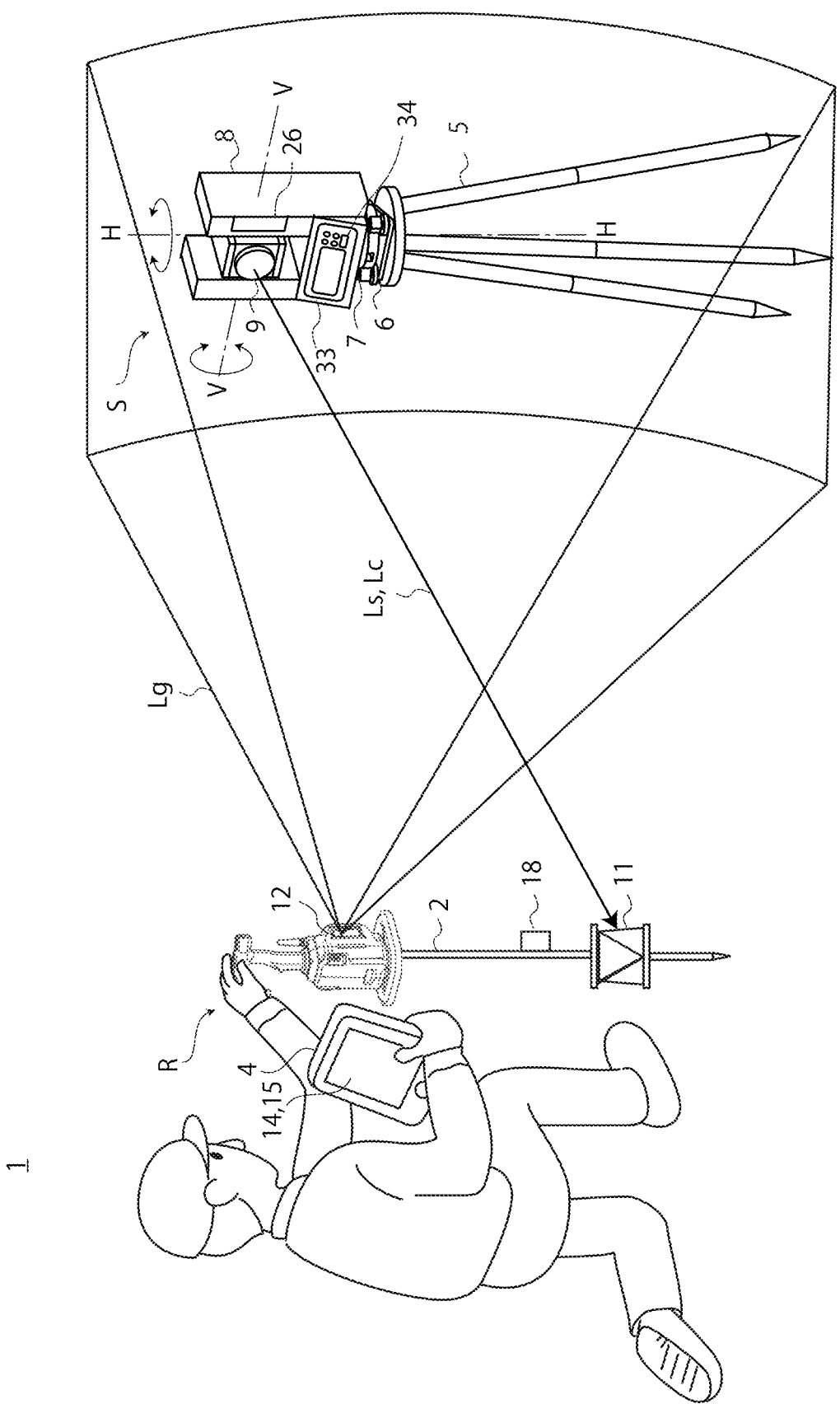
FIG. 2 is a schematic external perspective view illustrating an example of the scanner system.

FIG. 1 is a configuration block diagram of a scanner system (hereinafter, also simply referred to as the "system") 1 according to the first embodiment. FIG. 2 is a schematic configuration view illustrating one example of the system 1.

As illustrated in FIG. 1, the system 1 includes a remote controller R and a laser scanner S. The remote controller R includes a reflecting target 11, a guide light transmitting unit 12 that emits guide light Lg for notifying the direction of the guide light transmitting unit 12 to the laser scanner S, an arithmetic control unit 13, an input/operation unit 14, a display unit 15, and a communication unit 16.

As illustrated in FIG. 2, the remote controller R may be a system including a target unit 3 having the guide light transmitting unit 12 attached to the top of a long pole 2 and having the reflecting target 11 attached to the bottom of the pole 2 and a tablet terminal 4 including the arithmetic control unit 13, the input/operation unit 14, the display unit 15, and the communication unit 16.

The reflecting target 11 is, for example, an all-around (360°) prism having a plurality of corner cube prisms provided over the entire circumference. The reflecting target 11 retroreflects incident light in the incident direction. The reflecting target 11 is fixed at a predetermined distance from the ground surface.

The guide light transmitting unit 12 includes a laser light source that emits laser light, a relay lens that collimates emitted laser light into a parallel light beam, a cylindrical lens that enlarges the parallel light beam into a fan-shaped beam (fan beam), and a scanning means for scanning the fan beam in the vertical direction. Although not illustrated, the scanning means includes, for example, a rotating shaft orthogonal to the pole 2 and a rotation driving unit such as a motor.

The guide light transmitting unit 12 is configured to scan, in the vertical direction, a fan beam narrow in the vertical direction and wide in the horizontal direction. The above configuration is an example, and a known fan beam forming means can be used.

The arithmetic control unit 13 is a microcomputer including a CPU (central processing unit) that performs arithmetic processing, and a ROM (read only memory) and a RAM (random access memory) serving as auxiliary storage units.

The arithmetic control unit 13 is connected to the guide light transmitting unit 12, the input/operation unit 14, the display unit 15, and the communication unit 16. As in the case illustrated in FIG. 2, when the guide light transmitting unit 12 and the arithmetic control unit 13 are configured as separate units, the arithmetic control unit 13 and the guide light transmitting unit 12 are connected to each other via a wireless means such as infrared communication.

The arithmetic control unit 13 controls the guide light transmitting unit 12 and the display unit 15. The arithmetic control unit 13 receives information and commands from the input/operation unit 14. The arithmetic control unit 13 transmits an operation command to the laser scanner S in accordance with an input from the input/operation unit 14. The arithmetic control unit 13 also receives commands and data from the laser scanner S.

The input/operation unit 14 allows the worker to input commands to the guide light transmitting unit 12 and the laser scanner S.

The communication unit 16 includes a non-directional antenna, etc., and can perform wireless communication with the laser scanner S by radio waves.

The arithmetic control unit 13, the input/operation unit 14, the display unit 15, and the communication unit 16 are not limited to the tablet terminal 4 configured as a touch panel display integrating the input/operation unit 14 and the display unit 15 as illustrated in FIG. 2. The arithmetic control unit 13, the input/operation unit 14, the display unit 15, and the communication unit 16 may be configured as a data collector having a liquid crystal display as the display unit 15 and input keys as the input/operation unit 14. These units may be integrally provided in the housing of the guide light transmitting unit 12. Alternatively, each unit may be configured as a unit detachable from the guide light transmitting unit 12 or the pole 2.

(Configuration of Laser Scanner)

As illustrated in FIG. 2, the laser scanner S includes, in appearance, a leveling unit 6 attached at an installation point with a tripod 5, a horizontal rotating unit 7 provided on the leveling unit 6, and a bracket portion 8 provided on the horizontal rotating unit 7. The leveling unit 6 is a so-called leveling device including a leveling screw and a bubble tube. A concave portion is provided in the center of the bracket portion 8. The concave portion is provided with a projection unit 9.

The laser scanner S is configured such that a horizontal rotation driving unit 28, to be described later, rotates the horizontal rotating unit 7 by 360° around an axis H-H extending vertically. The laser scanner S is also configured such that a vertical rotation driving unit 23, to be described later, rotates the projection unit 9 by 360° around an axis V-V orthogonal to the axis H-H.

The laser scanner S includes a turning mirror 21, a vertical angle detector 22, the vertical rotation driving unit 23, a distance measuring unit 24, an automatic collimation unit 25, a guide light receiving unit 26, a communication unit 27, the horizontal rotation driving unit 28, a horizontal angle detector 29, a storage unit 31, a data storage unit 32, a scanner display unit 33, an operation unit 34, and a scanner arithmetic control unit 40.

The turning mirror 21 is provided inside the rotating shaft (not illustrated) of the projection unit 9 and rotates integrally with the projection unit 9 around the axis V-V.

The vertical angle detector 22 is a rotary encoder. The vertical angle detector 22 detects the rotational angle of the vertical rotating shaft, that is, the rotational angle of the turning mirror 21, and detects the vertical angle of the distance measurement optical axis of the laser scanner S. The vertical rotation driving unit 23 includes a motor and rotates the vertical rotating shaft of the projection unit 9 around the axis V-V.

Figure 3:
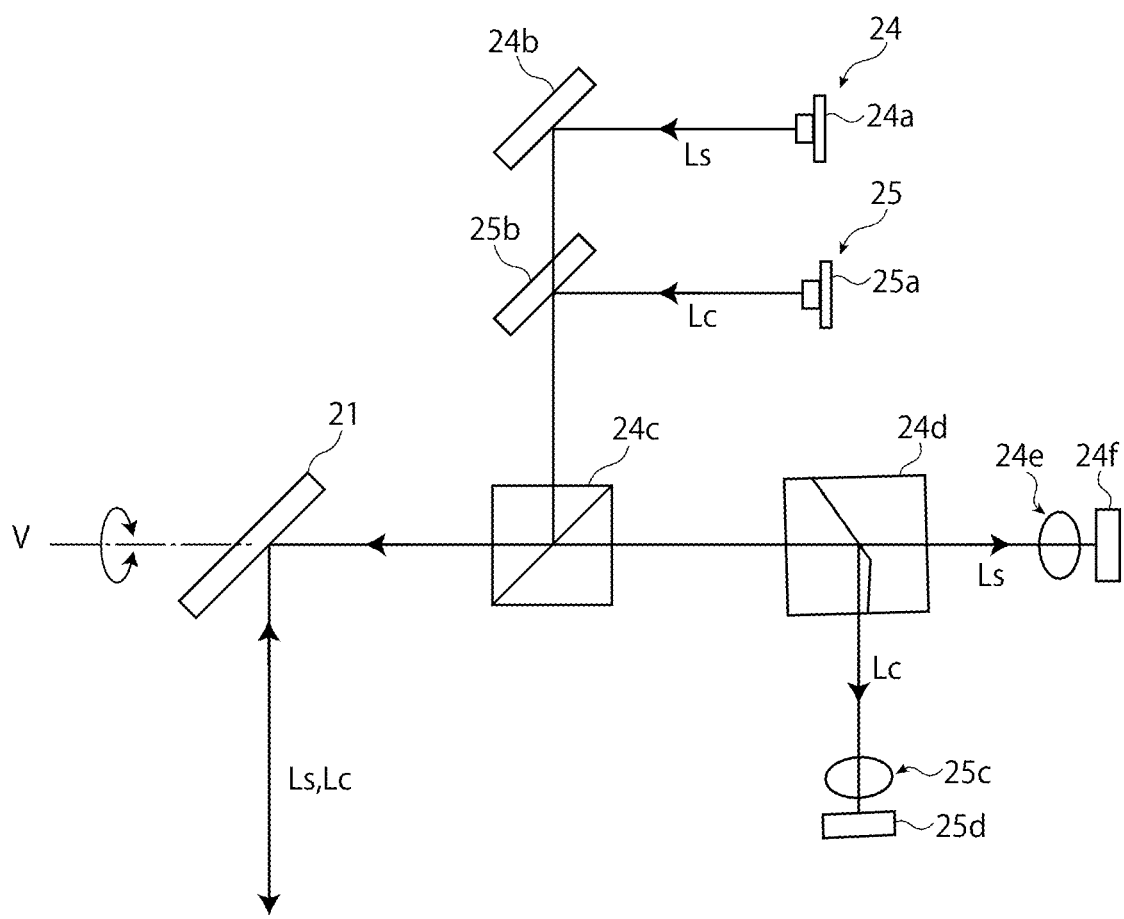
FIG. 3 is a view illustrating the optical systems of the distance measuring unit and automatic collimation unit of the laser scanner of the scanner system.

As illustrated in FIG. 3, the distance measuring unit 24 includes a distance-measuring light transmitting unit 24a, a distance-measuring light transmitting optical system 24b, a beam splitter 24c, a dichroic prism 24d, a distance-measuring light receiving optical system 24e, and a distance-measuring light receiving unit 24f. The distance-measuring light transmitting unit 24a includes a light emitting element such as a semiconductor laser and emits, for example, visible pulse laser light as scan light. The distance-measuring light receiving unit 24f is, for example, a light receiving element such as an avalanche photodiode. The optical axis of distance-measuring light exiting from the beam splitter 24c coincides with the axial center of the turning mirror 21.

Distance-measuring light Ls emitted from the distance-measuring light transmitting unit 24a is reflected by the turning mirror 21 via the distance-measuring light transmitting optical system 24b and the beam splitter 24c to be irradiated to a measurement target. The distance-measuring light retroreflected by the measurement target enters the distance-measuring light receiving unit 24f via the turning mirror 21, the beam splitter 24c, the dichroic prism 24d, and the distance-measuring light receiving optical system 24e. The distance-measuring light receiving unit 24f outputs the light reception signal of the incident light to the scanner arithmetic control unit 40.

The distance measuring unit 24 executes distance measurement for each pulse light of distance-measuring light based on the time difference (the round-trip time of pulse light) between the emission timing of the light emitting element and the light reception timing of the light receiving element (time of flight method). Note that distance measurement may be performed based on the phase difference between emitted light and reflected light upon irradiation of continuous light or intermittent light.

The distance-measuring light Ls is scanned in the vertical direction by the rotation of the turning mirror 21. The distance-measuring light Ls is scanned in the horizontal direction by the rotation of the horizontal rotating unit 7. This scans the distance-measuring light Ls over the entire circumference in the vertical and horizontal directions. The horizontal angle detector 29 and the vertical angle detector 22 detect the direction angle of a distance-measuring light optical axis at each irradiation point of the distance-measuring light Ls to measure a direction angle at each irradiation point.

The automatic collimation unit 25 includes a collimation light transmitting unit 25a, a collimation light transmitting optical system 25b, the beam splitter 24c and the dichroic prism 24d common to the distance measuring unit 24, a collimation light receiving optical system 25c, and a collimation light receiving unit 25d. The collimation light transmitting unit 25a includes a light emitting element such as a semiconductor laser and emits, as collimation light, light having a wavelength different from that of distance-measuring light, for example, infrared laser light. The collimation light receiving unit 25d is an image sensor such as a CCD or CMOS.

Collimation light Lc exiting from the collimation light transmitting unit 25a is deflected by the turning mirror 21 via the collimation light transmitting optical system 25b and the beam splitter 24c to be irradiated to a measurement target. The reflected collimation light retroreflected by the measurement object enters the collimation light receiving unit 25d via the turning mirror 21, the beam splitter 24c, the dichroic prism 24d, and the collimation light receiving optical system 25c. The collimation light receiving unit 25d outputs the pixel data obtained from the light reception signal to the scanner arithmetic control unit 40. The optical axis of the collimation light Lc exiting from the beam splitter 24c coincides with the optical axis of the distance-measuring light Ls, and is scanned in the vertical direction by the rotation of the turning mirror 21.

The guide light receiving unit 26 includes a cylindrical lens, a rectangular light receiving sensor, and a slit that limits a horizontal light reception range. As a result, the guide light receiving unit 26 can receive the guide light Lg even if there is a height difference between the laser scanner S and the remote controller R. The guide light receiving unit 26 is fixed at the front of the body of the laser scanner S. The guide light receiving unit 26 receives the guide light Lg and detects the horizontal direction of the guide light transmitting unit 12.

The communication unit 27 includes a non-directional antenna and can perform wireless communication with the remote controller R by radio waves.

The horizontal rotation driving unit 28 includes a motor and rotates the horizontal rotating unit 7 around the axis H-H under the control of the scanner arithmetic control unit 40.

The horizontal angle detector 29 is a rotary encoder. The horizontal angle detector 29 is provided with respect to the rotating shaft of the horizontal rotating unit 7 and detects the rotational angle of the horizontal rotating unit 7 in the horizontal direction. The horizontal angle detector 29 detects the horizontal angle of the distance measurement optical axis of the laser scanner S.

The storage unit 31 is, for example, a hard disk drive. The storage unit 31 stores programs and data for the execution of control and arithmetic processing (to be described later).

The data storage unit 32 is, for example, an SD card. The data storage unit 32 stores various types of measurement data acquired by the laser scanner S and data calculated by arithmetic processing.

The scanner display unit 33 and the operation unit 34 are user interfaces of the laser scanner S. In the illustrated case, these units are provided on the outer surface of the housing of the laser scanner S. The scanner display unit 33 and the operation unit 34 are configured to allow the worker to input commands and settings associated with the operation of the laser scanner S, confirm measurement results, and adjust the apparatus via the scanner display unit 33 and the operation unit 34.

The scanner arithmetic control unit 40 is a microcomputer including a CPU that performs arithmetic processing and a ROM, RAM, etc., as auxiliary storage units.

The scanner arithmetic control unit 40 is connected to the respective units, controls the units, and performs arithmetic processing for the data acquired by each unit. The scanner arithmetic control unit 40 communicates with the communication unit 16 of the remote controller R to execute processing in accordance with a command from the arithmetic control unit 13 of the remote controller R. Each function of the scanner arithmetic control unit 40 may be configured to be executed by a program, a circuit, or a combination of them.

The scanner arithmetic control unit 40 includes a guide light direction detection unit 41, an automatic collimation execution unit 42, a target scan execution unit 43, a coordinate/direction angle calculation unit 44, a data exclusion range setting unit 45, and a point cloud data measuring unit 46.

The guide light direction detection unit 41 drives the horizontal rotation driving unit 28 to horizontally rotate the laser scanner S. The guide light receiving unit 26 receives the guide light Lg. The horizontal angle detector 29 detects the horizontal direction of the center of the guide light transmitting unit 12. The distance measurement optical axis of the laser scanner S is then directed to the center of the guide light transmitting unit 12 based on an output signal from the guide light receiving unit 26.

The automatic collimation execution unit 42 controls the automatic collimation unit 25 and the vertical rotation driving unit 23 to scan the collimation light Lc in the vertical direction, and directs the laser scanner S so as to make the distance measurement optical axis coincide with the reflecting target 11 based on an output signal from the collimation light receiving unit 25d.

The target scan execution unit 43 executes a target scan function. The target scan execution unit 43 controls the distance measuring unit 24, the horizontal rotation driving unit 28, the horizontal angle detector 29, the vertical rotation driving unit 23, and the vertical angle detector 22 to concentrate the scan of a target scan range including the reflecting target 11 to acquire point cloud data. The target scan execution unit 43 obtains the three-dimensional coordinate value of the center position of the reflecting target 11 from the obtained point cloud data.

The coordinate/direction angle calculation unit 44 calculates the map coordinates of an instrument point and the direction angle of the laser scanner S in the reference direction which is installed at the instrument point by the backward intersection method or the instrument-point-and-rear viewpoint method based on coordinates, direction angles, and instrument heights known in advance at two or more known intersection points in the case of the backward intersection method, or a coordinate, direction angle, and instrument height at a rear viewpoint known in advance in the case of the rear viewpoint instrument point method. In the case of the rear viewpoint instrument point method, the coordinate/direction angle calculation unit 44 calculates the direction angle of the laser scanner S in the reference direction which is installed at an instrument point based on the direction angle of a known rear viewpoint point.

The data exclusion range setting unit 45 sets a data exclusion range ER based on the horizontal direction of the center of the guide light transmitting unit 12 which is detected by the guide light direction detection unit 41.

The point cloud data measuring unit 46 controls the distance measuring unit 24, the horizontal rotation driving unit 28, the horizontal angle detector 29, the vertical rotation driving unit 23, and the vertical angle detector 22 to scan the entire measurement range set in advance and measure three-dimensional point cloud data. Upon receiving a measurement permission from the remote controller R, the point cloud data measuring unit 46 remeasures the range set by the data exclusion range setting unit 45. In addition, the point cloud data measuring unit 46 deletes point cloud data of the data exclusion range ER from point cloud data of an entire measurement range set in advance, replaces the deleted data with remeasurement data of the data exclusion range ER which is acquired by remeasurement, and saves the resultant data as point cloud data of an entire measurement range in the data storage unit 32.

(Scan Method)

Figure 4:
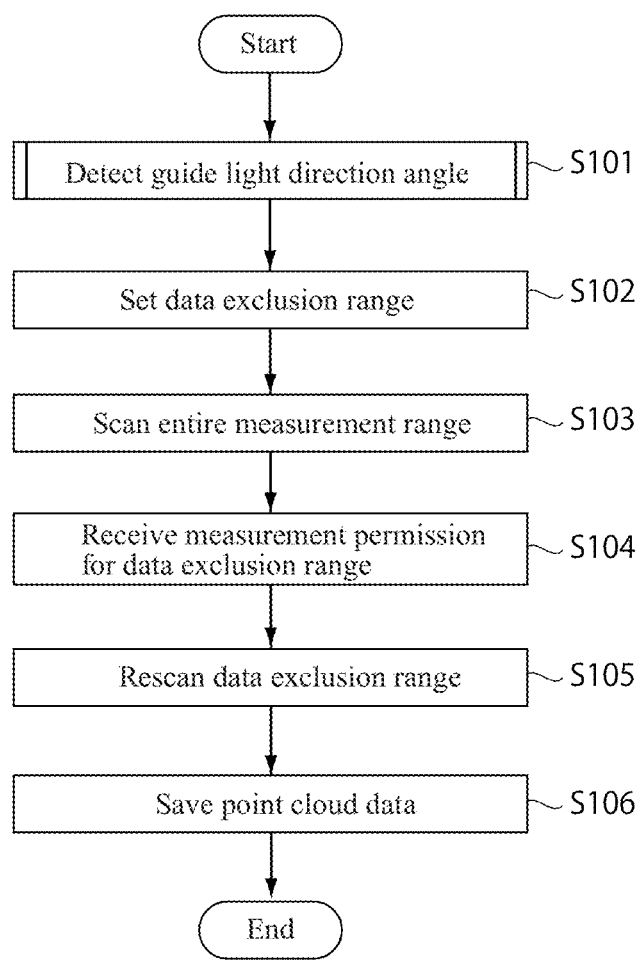
FIG. 4 is a flowchart illustrating an outline of a scan method using the scanner system.

FIG. 4 is a flowchart illustrating an outline of a scan method using the system 1. FIGS. 5A to 5E are views schematically illustrating how an example of the scan method using the system 1 is executed.

Described below is point group measurement at one instrument point when point cloud data is measured from a plurality of measurement points. The coordinates of an instrument point and necessary known points are prepared in advance. That is, when an instrument point is known and the coordinates are computed by the rear viewpoint-and-instrument-point method, one known point is prepared as a rear viewpoint. Whereas, when an instrument point is unknown and the coordinates are computed by the backward intersection method, two or more known points are prepared as known backward intersection points.

Assume that the measurement range of the laser scanner S is set with horizontal angles, and the laser scanner S scans over 360° in the vertical angle direction within the set horizontal angle range. In addition, in this case, the entire circumference (360°) is set as the measurement range set in advance.

For measurement preparation, the worker installs and levels the laser scanner S at an instrument point $P_1$. The worker also measures an instrument height and inputs the measured height to the laser scanner S. Thereafter, the worker moves to a known point K while carrying the remote controller R with him/her, and vertically installs the reflecting target 11 while confirming a level 18.

Figure 5A:
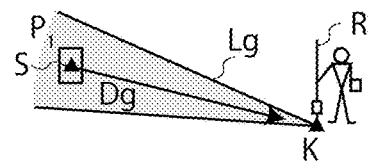
FIGS. 5A to 5E are views schematically illustrating how surveying is performed by the scan method.

When measurement starts, in Step S101, the laser scanner S detects guide light from the remote controller R, detects a horizontal direction Dg of the center of the guide light Lg, and directs the distance measurement optical axis of the laser scanner S to the guide light transmitting unit 12 (FIG. 5A). The details in Step S101 will be described later.

Figure 5B:
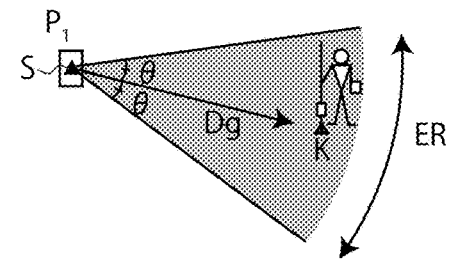

Next, in Step S102, the data exclusion range setting unit 45 sets the data exclusion range ER based on the angle of the horizontal direction Dg of the center of the guide light (hereinafter, referred to as the "guide light direction angle") Lg (FIG. 5B). The data exclusion range setting unit 45 sets the data exclusion range ER as the range of predetermined angles ($\pm\theta$, for example, $\pm 45°$) on both sides in the circumferential direction with reference to the horizontal direction Dg of the center of the guide light Lg (the guide light transmitting unit 12). In this manner, the data exclusion range ER can be set as a range including a worker near a known point K.

Figure 5C:
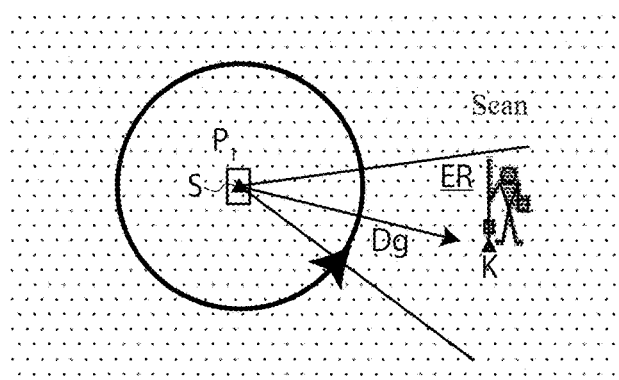
Figure 5D:
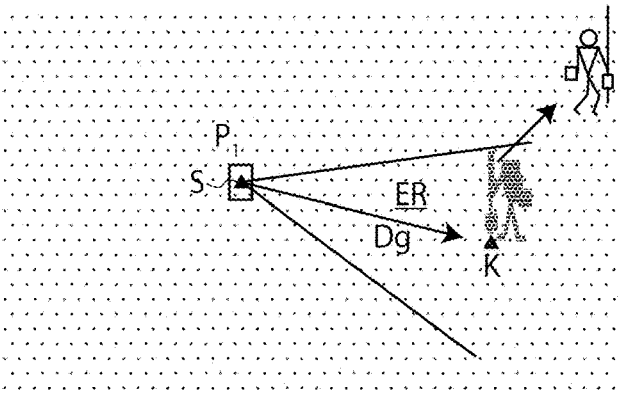

Next, in Step S103, the point cloud data measuring unit 46 executes a scan over a preset measurement range, that is, over the entire circumference (full dome scan) (FIG. 5C). At this time, the worker is reflected in the point cloud data. The worker stays in the data exclusion range ER during a full dome scan, and then retreats from the data exclusion range ER upon confirming that the rotating operation of the laser scanner S stops (FIG. 5D).

Next, in Step S104, the worker who has retreated from the data exclusion range ER inputs a transmission instruction to permit measurement of the data exclusion range ER with the input/operation unit 14 of the remote controller R. With this operation, the remote controller R transmits a measurement permission to the laser scanner S. The laser scanner S receives the measurement permission.

Figure 5E:
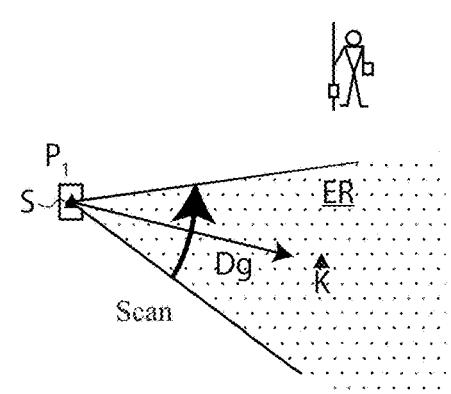
Figure 6:
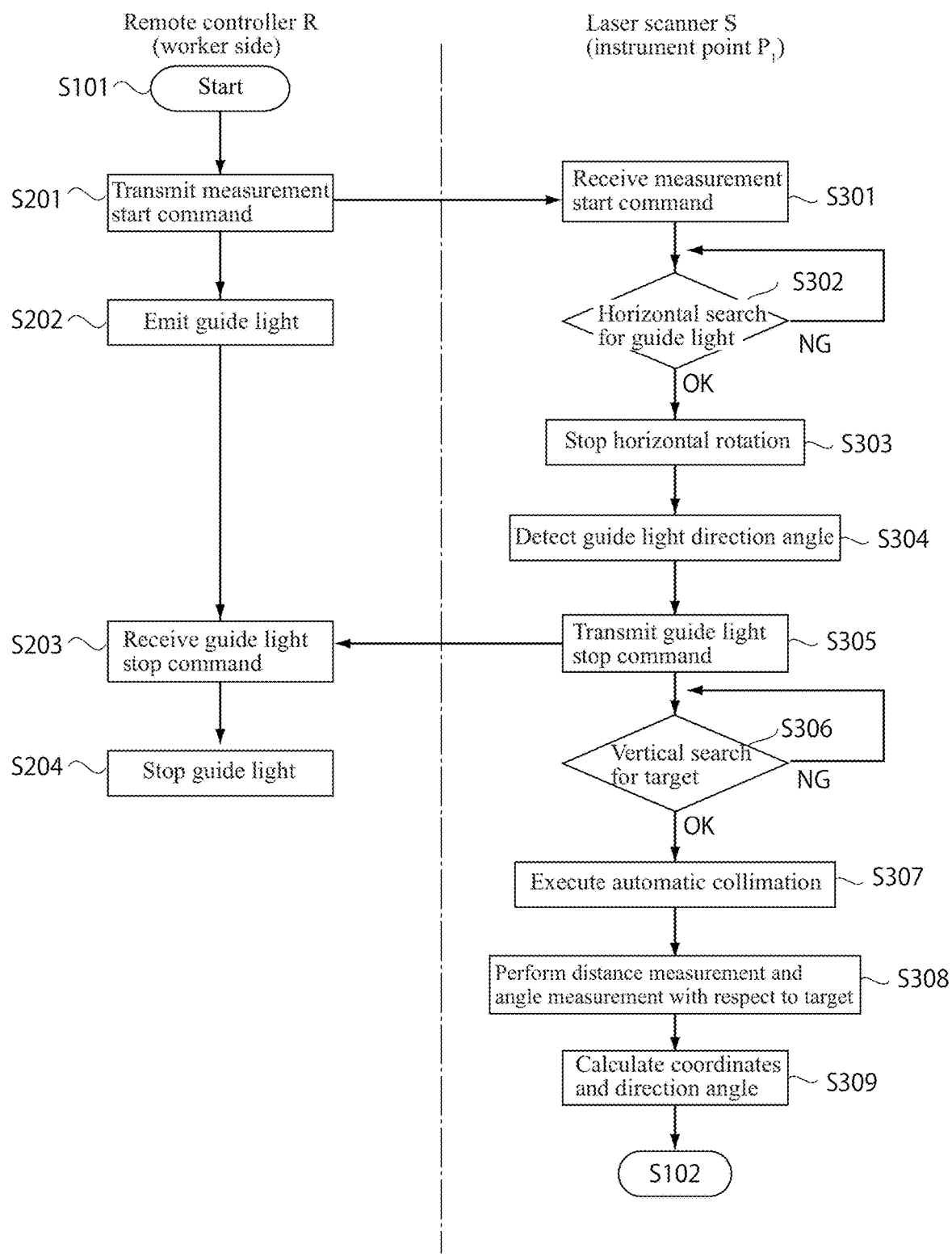
FIG. 6 is a flowchart illustrating the details of guide light direction detection in the scan method.

Next, in Step S105, the point cloud data measuring unit 46 remeasures the data exclusion range ER (FIG. 5E).

In Step S106, the point cloud data measuring unit 46 deletes point cloud data of the data exclusion range ER from point cloud data over the entire circumference which is acquired in Step S103, replaces the resultant data with remeasurement data of the data exclusion range ER which is remeasured in Step S105, and stores the resultant data as point cloud data of an entire measurement range (entire circumference) in the data storage unit 32.

The details of Step S101 will be described below. When the worker issues an instruction to start detecting a guide light direction angle with the input/operation unit 14 of the remote controller R, the remote controller R transmits a measurement start command to the laser scanner S and drives the guide light transmitting unit 12 to start emitting the guide light Lg (fan beam) in Step S201.

Upon receiving the measurement start command in Step S301, the laser scanner S performs a horizontal search for the guide light Lg while horizontally rotating in Step S302. More specifically, the guide light direction detection unit 41 drives the horizontal rotation driving unit 28 to horizontally rotate the laser scanner S until the guide light receiving unit 26 detects the guide light Lg.

When the guide light receiving unit 26 detects the guide light Lg, the guide light direction detection unit 41 aligns the distance measurement optical axis of the laser scanner S with the center of the guide light transmitting unit 12 and stops the horizontal rotation driving unit 28 in Step S303.

In Step S304, the guide light direction detection unit 41 detects the horizontal direction angle of the center of the guide light transmitting unit 12 and saves the direction angle in the data storage unit 32.

Next, in Step S305, the laser scanner S transmits a guide light stop command to the remote controller R. Upon receiving the guide light stop command in Step S203, the remote controller R stops emitting the guide light Lg in Step S204.

Next, in Step S306, the laser scanner S performs a vertical search for the reflecting target 11. More specifically, the automatic collimation execution unit 42 drives the vertical rotation driving unit 23 and the automatic collimation unit 25 to scan collimation light in the vertical direction until the collimation light receiving unit 25*d* detects the collimation light Lc. When the collimation light receiving unit 25*d* receives reflected light from the reflecting target 11, the process shifts to Step S307, in which the automatic collimation execution unit 42 executes automatic collimation.

Next, in Step S308, the target scan execution unit 43 executes a target scan and performs distance measurement and angle measurement with respect to the reflecting target 11 of the remote controller R installed at the known point K as a rear viewpoint.

Next, in Step S309, the coordinate/direction angle calculation unit 44 calculates the map coordinates of the instrument point $P_1$ and the direction angle of the laser scanner S by the backward intersection method or the rear viewpoint-and-instrument-point method based on the distance to the reflecting target 11, the angle of the reflecting target 11, and the coordinates of the known point K. The calculated map coordinates and the scanner direction angle are stored in the data storage unit 32 in association with the instrument point $P_1$. The process then shifts to Step S102.

In the rear viewpoint-and-instrument-point method, since the coordinates of an instrument point are known, the calculation of the coordinates can be omitted. However, calculating the coordinates makes it possible to use the calculated value to confirm the known coordinate value.

On the other hand, in the case of the backward intersection method, the instrument point $P_1$ is unknown, and at least two known backward intersection points are required. Accordingly, after the processing from Step S201 to Step S308 is performed with respect to at least two known backward intersection points, the process shifts to Step S309.

Note that the point K being a known point itself is not essential to the surveying method according to this embodiment. However, in order to convert the point cloud data acquired by the laser scanner S installed at the instrument point $P_1$ into data in the map coordinate system, it is essential to acquire the coordinates of the instrument point $P_1$ and the direction angle of the laser scanner S. The above method is a measurement example for acquiring the coordinates of the instrument point $P_1$ and the direction angle of the laser scanner S.

As described above, this embodiment is configured such that the guide light transmitting unit 12 is provided for the remote controller R, the guide light receiving unit 26 is provided for the laser scanner S, the laser scanner S detects the central direction of the guide light transmitting unit 12, and the data exclusion range ER is set with reference to the central direction of the guide light transmitting unit 12 to delete the data exclusion range ER from point cloud data of an entire measurement range. The above configuration can exclude the worker and the reflecting target 11 near the guide light transmitting unit 12 from measured point cloud data.

Upon retreating from the data exclusion range ER, the worker remeasures the data exclusion range ER and replaces the deleted data with the remeasurement data. This configuration makes it possible to acquire point cloud data of an entire measurement range that does not include the worker or the unnecessary reflecting target 11 at a measurement site. As a result, even when, for example, the worker or an unnecessary target may be reflected in point cloud data, it is possible to prevent remeasurement after the worker brings back the data to the office.

In this embodiment, when the worker moves to the next instrument point at the same time when retreating from the data exclusion range ER, the data exclusion range ER is remeasured during the movement of the worker. This makes it possible to avoid unnecessary wait time.

(Modification 1: Modification Pertaining to Setting of Data Exclusion Range ER)

Figure 7A:
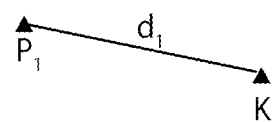
FIGS. 7A and 7B are views for explaining a data exclusion range setting method according to a modification of the embodiment.
Figure 7B:
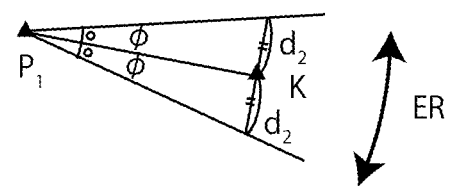

In the system 1 according to the above embodiment, the data exclusion range ER can also be set in the manner illustrated in FIGS. 7A and 7B. The data exclusion range setting unit 45 acquires a distance $d_1$ from the distance measurement data of the reflecting target 11 of the remote controller R which is acquired in Step S308 (FIG. 7A).

Next, the data exclusion range setting unit 45 obtains angle ranges ±ϕ serving as the ranges of predetermined distances $d_2$ on both sides of the known point K in the circumferential direction at the time of observation from the instrument point $P_1$. The distances $d_2$ are preferably long enough to allow the worker to completely conceal, for example, ±1 m on the right and left sides of the known point K, at the time of observation from the instrument point $P_1$. The data exclusion range setting unit 45 sets the angle ranges of ±ϕ on both sides of the known point K in the circumferential direction as the data exclusion range ER (FIG. 7B).

In this modification, the data exclusion range ER is set as predetermined distance ranges on both sides of the remote controller R based on the distance $d_1$ from the laser scanner S to the remote controller R by using the distance measurement data about the known point K (the reflecting target 11). This makes it possible to accurately set a minimum range that can include the worker regardless of the distance $d_1$ from the laser scanner S to the remote controller R.

As a result, it is possible to minimize the moving distance by which the worker of the data exclusion range ER retreats from the data exclusion range ER.

(Modification 2: Modification Pertaining to Configuration of Laser Scanner)

Figure 8:
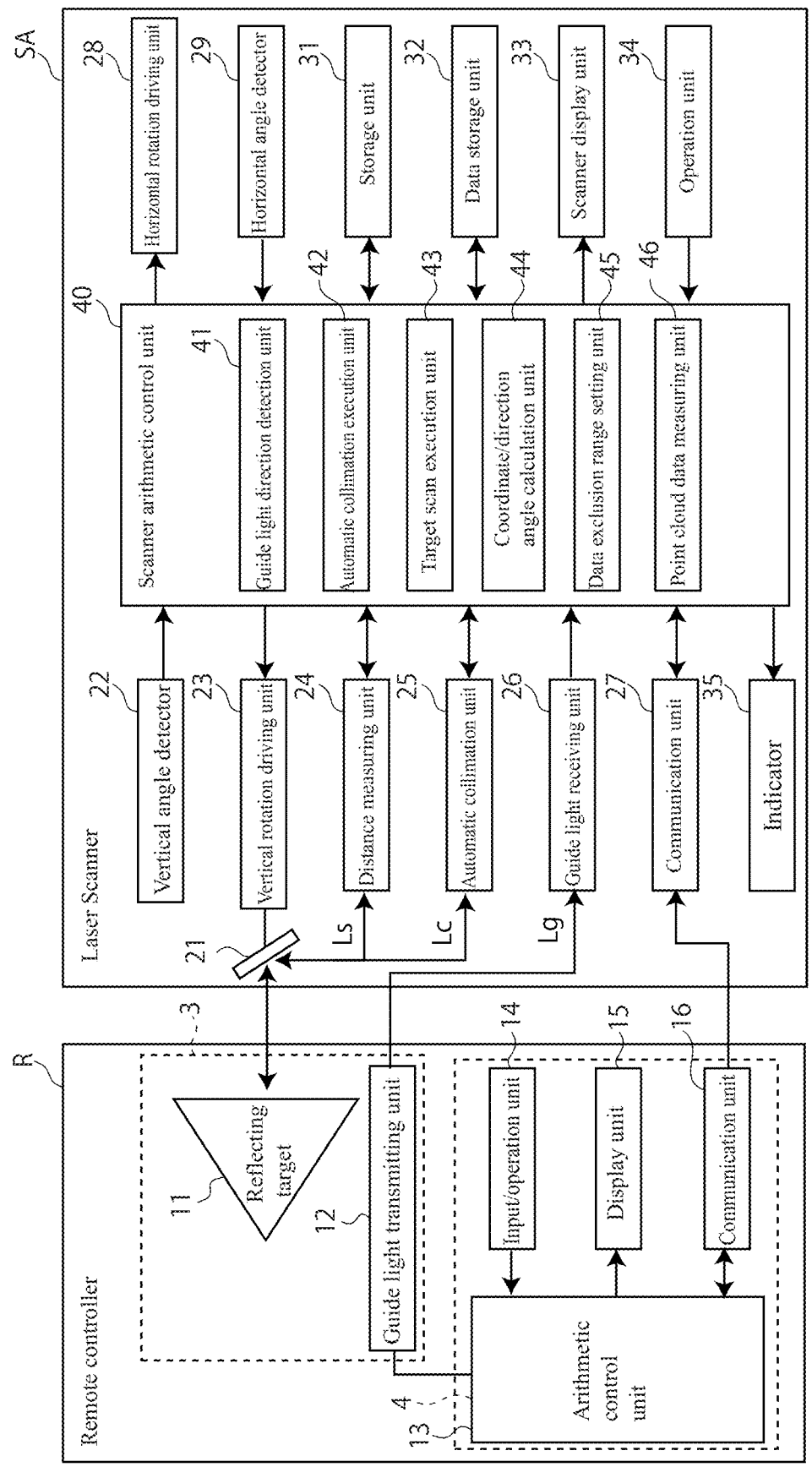
FIG. 8 is a configuration block diagram of a scanner system according to another modification of the embodiment.

FIG. 8 is a configuration block diagram of a scanner system 1A according to the modification 2. The system 1A has almost the same configuration as that of the system 1. However, these systems differ in that the laser scanner SA includes an indicator 35 that notifies whether a scan over the measurement range set in advance is being executed.

The indicator 35 includes an LED light source and is configured to selectively emit red light or green light. The indicator 35 is mounted on the top of the laser scanner S so as to be visible from 360° in the horizontal direction. Under the control of the scanner arithmetic control unit 40, the indicator 35 is turned red while the laser scanner SA is scanning over the entire measurement range set in advance, and the indicator 35 is turned green when the laser scanner SA has completed a scan over the entire measurement range.

This configuration allows the worker to easily recognize whether the laser scanner S has completed a scan over the entire measurement range set in advance while the worker is standing by in the data exclusion range ER. As a result, the worker can retreat from the data exclusion range ER upon reliably completing a scan over the entire measurement range set in advance, and transmit a measurement permission for the data exclusion range ER. This makes it possible to more reliably prevent the worker from being reflected in point cloud data.

(Modification 3: Another Modification Pertaining to Configuration of Laser Scanner)

Figure 9:
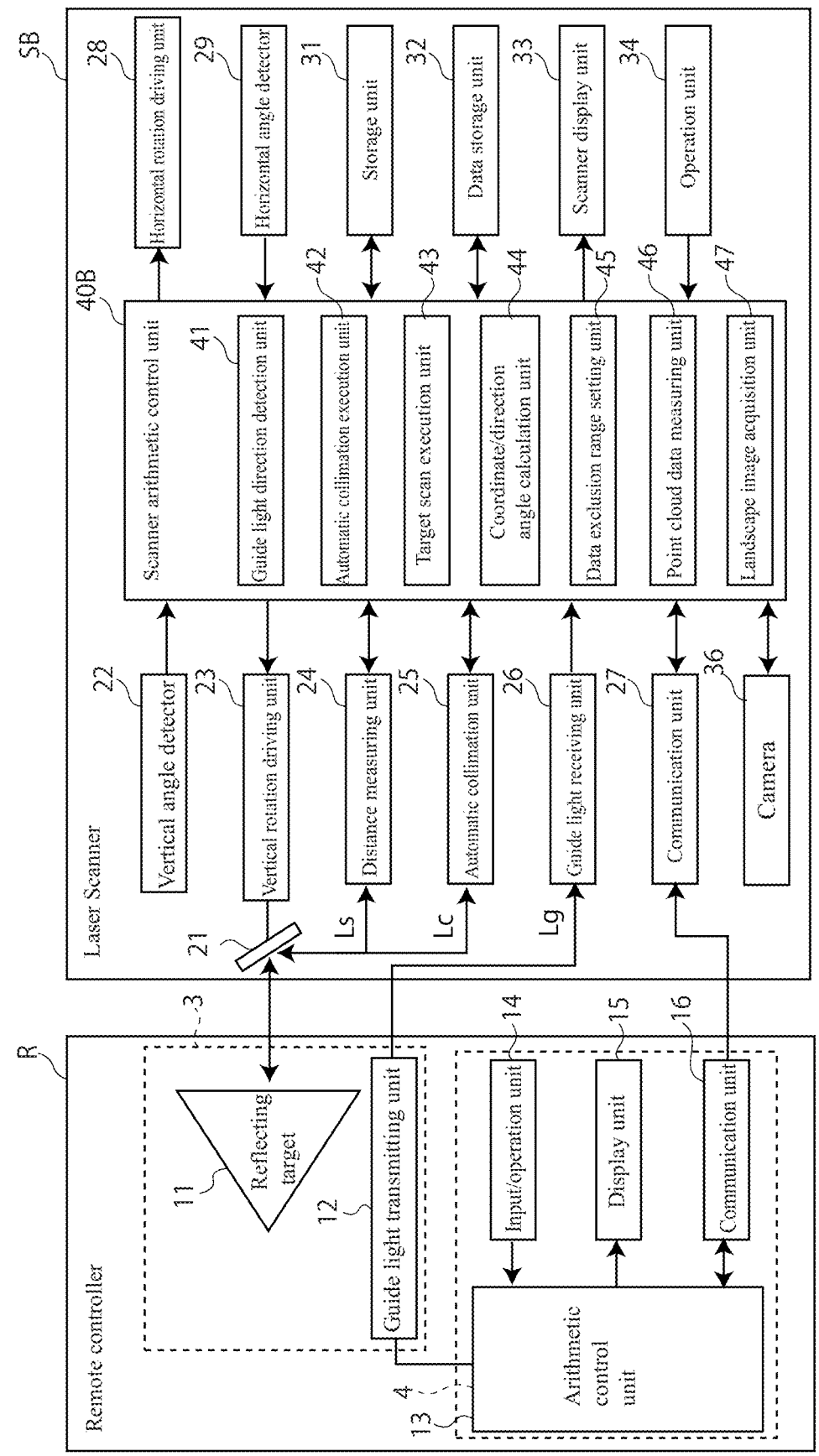
FIG. 9 is a configuration block diagram of a scanner system according to still another modification of the embodiment.
Figure 10:
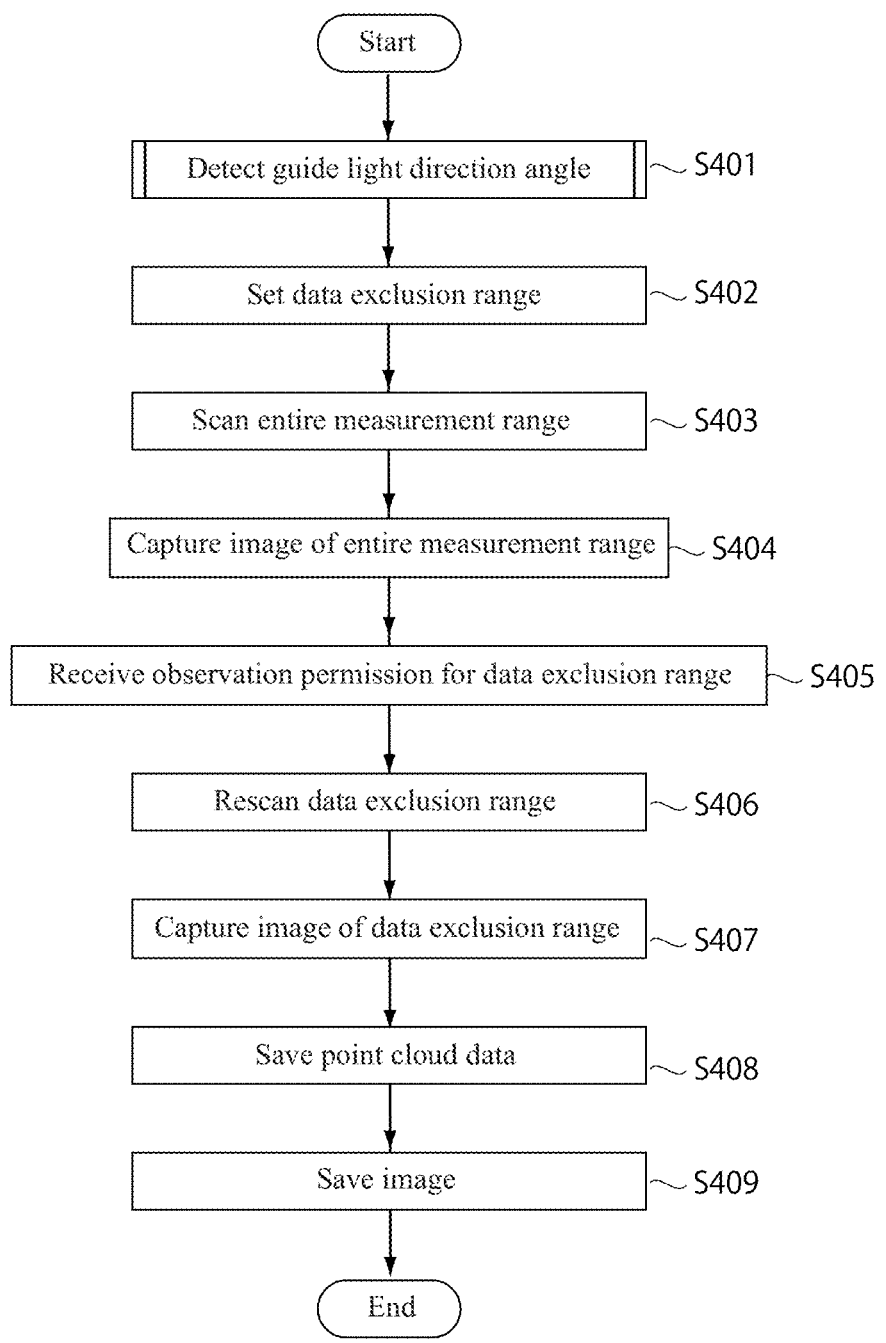
FIG. 10 is a flowchart illustrating an outline of a scan method using the scanner system according to the modification.

FIG. 9 is a configuration block diagram of a scanner system 1B according to the modification 3. FIG. 10 is a flowchart illustrating an outline of a scan method using the system 1B. The system 1B has almost the same configuration as that of the system 1 but further includes a camera 36. A scanner arithmetic control unit 40B includes a landscape image acquisition unit 47.

The camera 36 is a so-called digital camera and includes an image sensor such as a CCD or CMOS sensor as an image pickup device. The camera 36 is provided for the projection unit 9 of the laser scanner S such that the collimation optical axis of the camera 36 almost coincides with the distance measurement optical axis of the laser scanner S.

The camera 36 is configured to acquire the measurement range of point cloud data obtained by the laser scanner S as image data. The image data acquired by the camera 36 is output as a digital signal to the scanner arithmetic control unit 40B and acquired as a landscape image. The acquired landscape image is stored in the data storage unit 32 and used for, for example, the coloring of point cloud data.

The landscape image acquisition unit 47 acquires a landscape image from the image data output from the camera 36. The landscape image acquisition unit 47 also acquires a landscape image in the measurement range set in advance. The landscape image acquisition unit 47 re-captures a landscape image in the range set by the data exclusion range setting unit 45 upon receiving a measurement permission from the remote controller R.

The landscape image acquisition unit 47 excludes a landscape image of the data exclusion range ER from a landscape image of an entire measurement range set in advance, replaces the excluded landscape image with a landscape image of the data exclusion range ER which is remeasured, and stores the resultant image as a landscape image of an entire measurement range in the data storage unit 32.

When measurement using the system 1B starts, like the system 1 in steps S101, S102, and S103, the system 1B performs detection of a guide light direction angle (S401), setting of the data exclusion range ER (S402), and a scan over the entire measurement range (S403).

Next, in Step S404, the camera 36 captures a landscape image of an entire measurement range. Next, in Step S405, as in Step S104, when a laser scanner SB receives a measurement permission for the data exclusion range ER from the remote controller R, the point cloud data measuring unit 46 remeasures the data exclusion range ER in Step S406 as in Step S105.

Next, in Step S407, the camera 36 re-captures a landscape image of the data exclusion range ER. Next, in Step S408, as in Step S106, the point cloud data measuring unit 46 deletes point cloud data of the data exclusion range ER from point cloud data on the entire circumference acquired in Step S403. The point cloud data measuring unit 46 then replaces the deleted data with remeasurement point cloud data of the data exclusion range ER which is remeasured in Step S406, and stores the resultant data as point cloud data of an entire measurement range (entire circumference) in the data storage unit 32.

Next, in Step S409, the landscape image acquisition unit 47 deletes a landscape image of the data exclusion range ER from the landscape image of an entire circumference which is captured in Step S404, replaces the deleted data with the re-captured landscape image of the data exclusion range ER, and stores the resultant data as a landscape image of an entire measurement range in the data storage unit 32.

The landscape image captured by the camera 36 is used for post-processing such as coloring of point cloud data. Accordingly, it is not preferable that the worker or an unnecessary target is reflected in the landscape image. In this modification, it is configured that the data exclusion range ER is also applied to the landscape image captured by the camera 36, and re-capturing is performed for the data exclusion range ER when the worker retreats from the data exclusion range ER and a measurement permission for the data exclusion range ER is issued.

Then, a landscape image of the data exclusion range ER in which the worker, etc., is reflected is deleted. The deleted image is replaced with a landscape image of the data exclusion range ER which is re-captured. This makes it possible to acquire a landscape image of an entire measurement range in which no worker, etc., is reflected. As a result, it is also possible to prevent the worker or an unnecessary target from being reflected in the landscape image acquired by the camera 36.

Although the preferred embodiments of the present invention have been described above, the above embodiments are examples of the present invention and these can be combined based on the knowledge of a person skilled in the art, and such combined embodiments are also included in the scope of the present invention.

REFERENCE SIGNS LIST 1, 1A, 1B Scanner system
S, SA, SB Laser scanner
R Remote controller
11 Reflecting target
12 Guide light transmitting unit
16 Communication unit
21 Turning mirror
22 Vertical angle detector
23 Vertical rotation driving unit
24 Distance measuring unit
26 Guide light receiving unit
27 Communication unit
28 Horizontal rotation driving unit
29 Horizontal angle detector
35 Indicator
36 Camera
40, 40B Scanner arithmetic control unit
41 Guide light direction detection unit
42 Automatic collimation execution unit
43 Target scan execution unit
44 Coordinate/direction angle calculation unit
45 Data exclusion range setting unit
46 Point cloud data measuring unit
47 Landscape image acquisition unit
ER Data exclusion range

The invention claimed is:

1. A scanner system comprising:
a remote controller including an arithmetic control unit configured to transmit an operation command to a laser scanner and a guide light transmitting unit configured to scan a fan beam as guide light in a vertical direction; and
a laser scanner including a guide light receiving unit configured to receive the guide light and detect a horizontal direction of a center of the guide light transmitting unit and a point cloud data measuring unit configured to acquire three-dimensional point cloud data by scanning distance-measuring light in a vertical direction and a horizontal direction and performing distance measurement and angle measurement with respect to an irradiation point of the distance-measuring light,
wherein the laser scanner comprises a guide light direction detection unit configured to direct an optical axis of the distance-measuring light to the guide light transmitting unit based on a light reception signal from the guide light receiving unit and a data exclusion range setting unit configured to set a predetermined angle range as a data exclusion range with reference to a direction of the guide light transmitting unit, and the point cloud data measuring unit re-measures point cloud data of the data exclusion range in accordance with a measurement permission from the remote controller after measuring point cloud data of an entire measurement range set in advance, deletes point cloud data of the data exclusion range from point cloud data of an entire measurement range which is measured first, and acquires entire point cloud data by replacing the deleted point cloud data with remeasured point cloud data.

2. The scanner system according to claim 1, wherein the remote controller includes a reflecting target,
the laser scanner comprises an automatic collimation execution unit configured to emit collimation light different in wavelength from the distance-measuring light and automatically collimate the reflecting target based on a light reception signal from an automatic collimation unit configured to receive reflected light of the collimation light and a target scan execution unit configured to perform distance measurement and angle measurement with respect to the reflecting target, and
the data exclusion range is set as the predetermined angle ranges as the predetermined distance ranges on both sides of a direction of the guide light transmitting unit in a circumferential direction.

3. The scanner system according to claim 1, wherein the laser scanner comprises an indicator for notifying a completion of measurement of point cloud data of an entire measurement range set in advance.

4. The scanner system according to claim 2, wherein the laser scanner comprises an indicator for notifying a completion of measurement of point cloud data of an entire measurement range set in advance.

5. The scanner system according to claim 1, wherein the laser scanner comprises a camera configured to acquire a landscape image of a measurement range of the laser scanner and a landscape image acquisition unit configured to control the camera, and
the camera re-captures a landscape image of the data exclusion range in accordance with a measurement permission from the remote controller upon capturing a landscape image of an entire measurement range set in advance, deletes the landscape image of the data exclusion range from the landscape image of an entire measurement range, and replaces the deleted landscape image with a remeasured landscape image of the data exclusion range to acquire a landscape image of an entire measurement range.

6. The scanner system according to claim 2, wherein the laser scanner comprises a camera configured to acquire a landscape image of a measurement range of the laser scanner and a landscape image acquisition unit configured to control the camera, and the camera re-captures a landscape image of the data exclusion range in accordance with a measurement permission from the remote controller upon capturing a landscape image of an entire measurement range set in advance, deletes the landscape image of the data exclusion range from the landscape image of an entire measurement range, and replaces the deleted landscape image with a remeasured landscape image of the data exclusion range to acquire a landscape image of an entire measurement range.

7. The scanner system according to claim 3, wherein the laser scanner comprises a camera configured to acquire a landscape image of a measurement range of the laser scanner and a landscape image acquisition unit configured to control the camera, and the camera re-captures a landscape image of the data exclusion range in accordance with a measurement permission from the remote controller upon capturing a landscape image of an entire measurement range set in advance, deletes the landscape image of the data exclusion range from the landscape image of an entire measurement range, and replaces the deleted landscape image with a remeasured landscape image of the data exclusion range to acquire a landscape image of an entire measurement range.

8. The scanner system according to claim 4, wherein the laser scanner comprises a camera configured to acquire a landscape image of a measurement range of the laser scanner and a landscape image acquisition unit configured to control the camera, and the camera re-captures a landscape image of the data exclusion range in accordance with a measurement permission from the remote controller upon capturing a landscape image of an entire measurement range set in advance, deletes the landscape image of the data exclusion range from the landscape image of an entire measurement range, and replaces the deleted landscape image with a remeasured landscape image of the data exclusion range to acquire a landscape image of an entire measurement range.

9. A scan method using a remote controller including an arithmetic control unit configured to transmit an operation command to a laser scanner and a guide light transmitting unit configured to scan a fan beam as guide light in a vertical direction, and a laser scanner including a guide light receiving unit configured to receive the guide light and detect a horizontal direction of a center of the guide light transmitting unit and configured to acquire three-dimensional point cloud data by scanning distance-measuring light in a vertical direction and a horizontal direction and performing distance measurement and angle measurement with respect to an irradiation point of the distance-measuring light, the method comprising:

(a) the laser scanner detecting a direction of the guide light transmitting unit and directing an optical axis of the distance-measuring light to the guide light transmitting unit based on a light reception signal from the guide light receiving unit;

(b) the laser scanner setting a data exclusion range with reference to a direction of the guide light transmitting unit;

(c) the laser scanner measuring point cloud data of an entire measurement range set in advance;

(d) the laser scanner receiving a measurement permission for the data exclusion range from the remote controller; and (e) the laser scanner remeasuring point cloud data of the data exclusion range, deleting point cloud data of the data exclusion range from point cloud data of the entire measurement range which is measured first, and replacing the deleted point cloud data with remeasured point cloud data to acquire point cloud data of the entire measurement range.

* * * * *